Patented Nov. 19, 1940

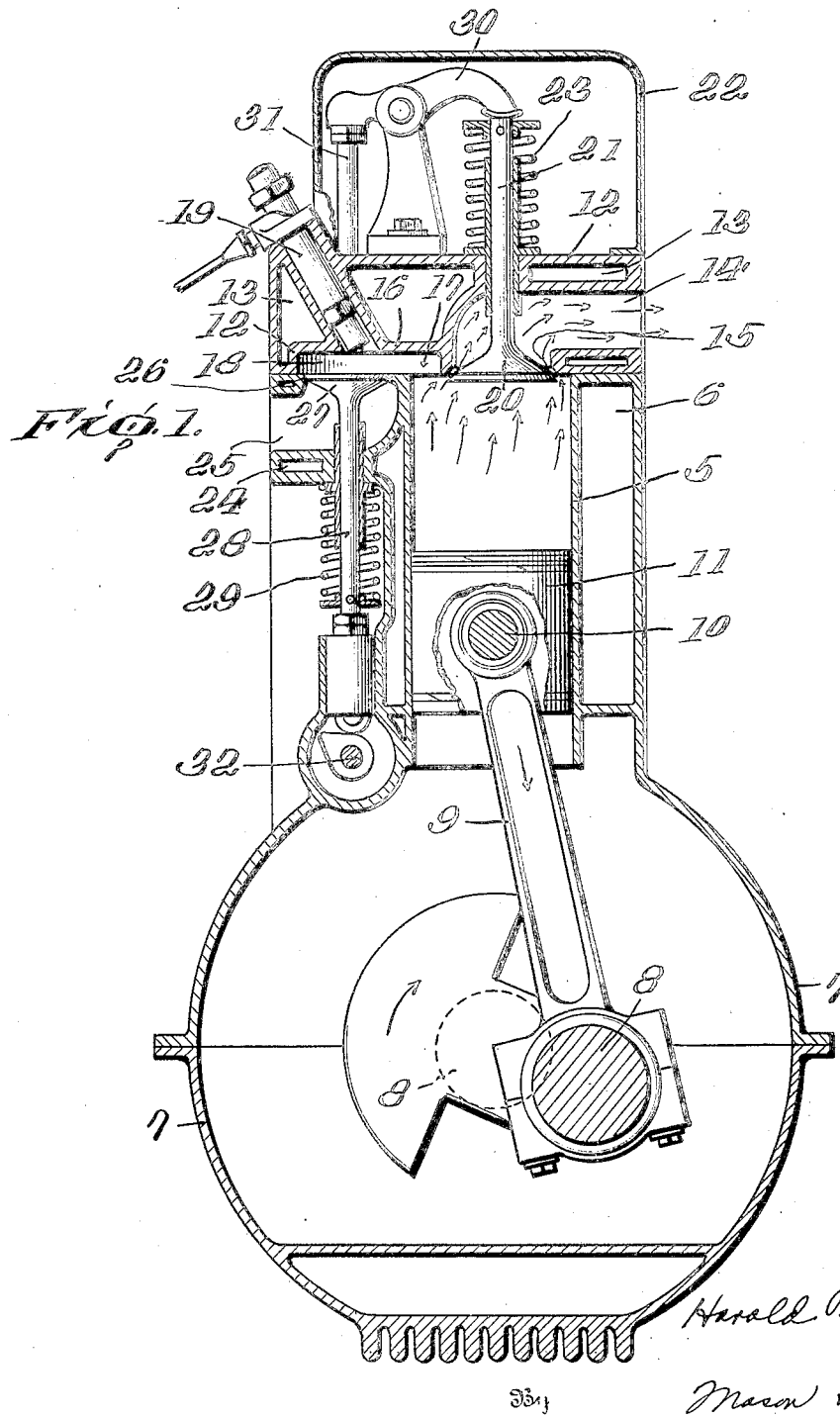

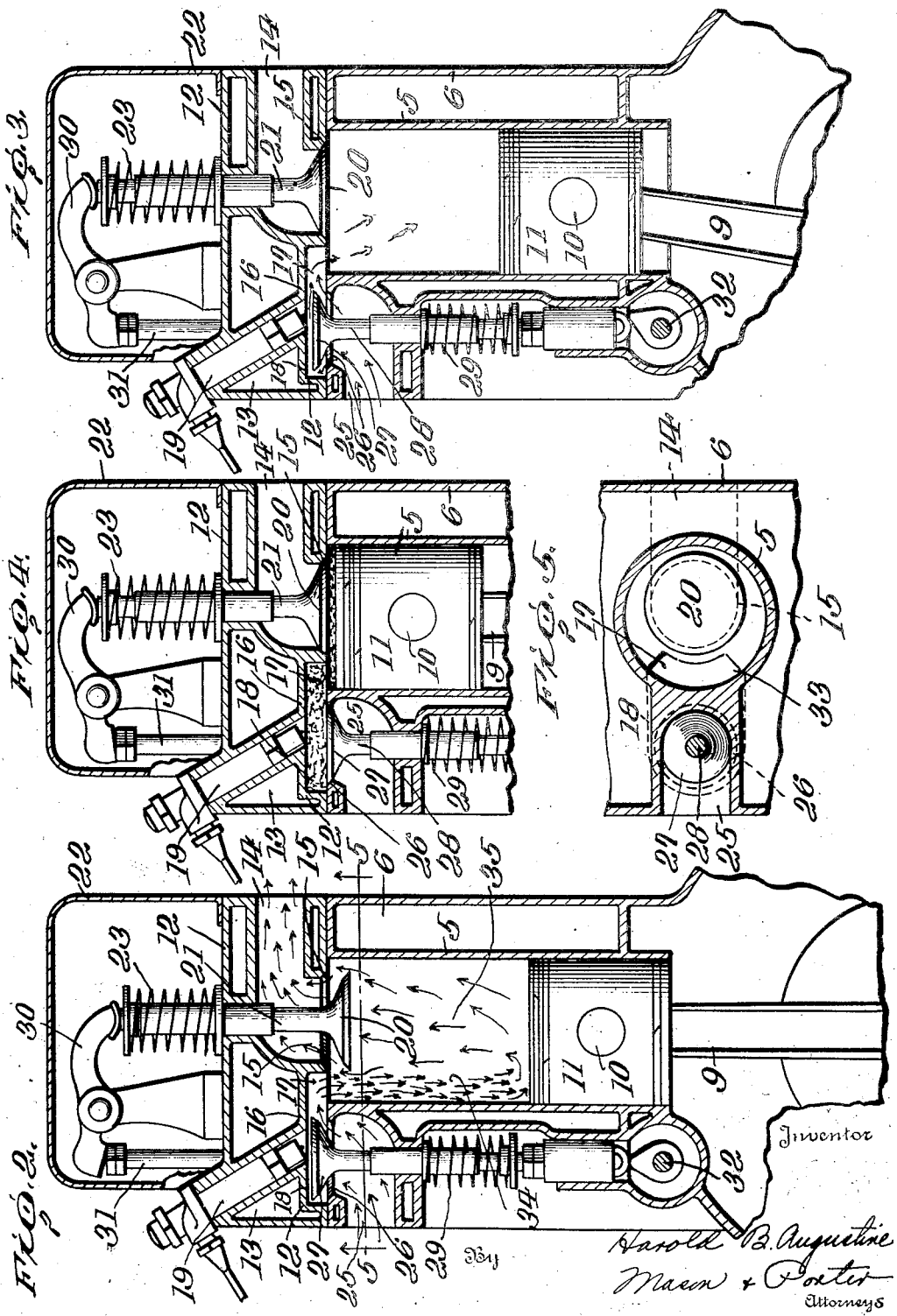

2,222,134

UNITED STATES PATENT OFFICE 2,222,134

INTERNAL COMBUSTION ENGINE

Harold B. Augustine, Kenmore, N. Y.

Application May 24, 1938, Serial No. 209,838

2 Claims. (Cl. 123—32)

The invention relates generally to internal combustion engines, especially those of the two-cycle Diesel type, and primarily seeks to provide certain new and useful improvements in the construction and the cooperative arrangement of the cylinder, the head and the valves intended to provide for a more efficient and economical operation of such engines, and a more thorough scavenging of products of combustion than has heretofore been possible.

In engines of the type stated a power impulse is exerted during each rotation of the crank shaft, and the four operations of charging, compression, explosion, and expulsion or exhaust are carried out during two strokes of the piston. The piston usually serves as exhaust valve; the exploded charge escaping through ports in the cylinder wall, which are uncovered by the piston as it nears the extremity of its power stroke. The incoming charge is either admitted by a separate valve or pump, or else passes into the cylinder by ports opposite the exhaust ports, the charge being deflected to the end of the cylinder by a ridge upon the piston, and scavenging out the products of combustion as it comes in. Compression ensues upon closing of the inlet and outlet ports, and the air charge is rendered incandescent by compression, and upon injection thereinto of the fuel oil, near the completion of the compression stroke of the piston, explosion occurs. In engines of known form, the construction and arrangements of the cylinder, head, pistons and valves have made thorough scavenging difficult if not impossible because of turbulence and vortices set up in the incoming air charges, pistons have been undesirably long and cumbersome because of their necessary function in port and charge control, and lubrication problems have resulted, all contributing toward limitation of the efficiency of such engines.

The present invention seeks to remedy the conditions and problems above mentioned, and has for an object to provide a novel engine structure including a cylinder devoid of wall porting, and intake and exhaust equipments disposed at the outer end of the cylinder and so cooperatively arranged that exhaust passages can be provided having an area very large compared with a given cylinder diameter, and the air effective to scavenge the cylinder through the relatively large exhaust passages is caused to enter the cylinder in a solid column parallel and adjacent one cylinder wall, without objectionable turbulence or vortices, thereby to effect a very thorough and rapid scavenging of the cylinder.

Another object of the invention is to provide an improved engine structure of the character stated in which the large capacity exhaust passages are provided in the cylinder head, and in which the air for charging and scavenging purposes enters through a chamber enlargement in said head and extending in part over the cylinder and in part laterally beyond the cylinder, said chamber enlargement communicating with the cylinder along one wall thereof through a relatively narrow arcuate passageway so as to direct the air in a solid arcuate column along said wall to engage the piston and be diverted by said piston toward the exhaust passages, without vortices or swirling.

With the above and other objects in view which will hereinafter appear, the nature of the invention will be more fully understood by following the description, the appended claims, and the several views illustrated in the accompanying drawings.

In the drawings:

Figure 1 is a vertical cross section of a 2-cycle engine of the Diesel type embodying the invention, the piston being shown moving on its inward or power stroke and the exhaust valve as just having been cracked open.

Figure 2 is a fragmentary view similar to Figure 1, the piston being illustrated at the end of its power stroke, the exhaust valve being open, and the inlet valve being open to admit scavenging air.

Figure 3 is a view similar to Figure 2, the exhaust valve being closed and the inlet valve open for supercharging the cylinder.

Figure 4 is a view similar to Figure 3 with the parts positioned for commencement of the power stroke, both valves being closed, the air charge being compressed, and fuel just having been injected into the combustion chamber.

Figure 5 is a horizontal section taken on the line 5—5 on Figure 2.

The improved engine structure includes a cylinder 5, suitably jacketed as at 6, and a crank case 7 for accommodating the usual counterbalanced crank shaft 8 connected by pitman 9 and wrist pin 10 with the piston 11 reciprocably mounted in the cylinder. The cylinder being devoid of side ports to be controlled by piston movement, the piston 11 can be constructed with a relatively short skirt thereby avoiding excessive weight.

A cylinder head 12 is attached to the cylinder block and is suitably jacketed as at 13 and provided with an exhaust passage 14 communicating with the upper end of the cylinder through a relatively large exhaust port or valve seat 15. It will be noted that the exhaust valve seat is disposed slightly to one side of the axis of the cylinder and is of a diameter considerably in excess of half the diameter of the cylinder. It is desirable that the exhaust valve seat be constructed and positioned as specifically described, but the invention comprehends the use of exhaust passageway equipment of relatively large area as compared to a given diameter of cylinder, and if desired a plurality of exhaust valves and seats collectively providing the desired exhaust capacity can be utilized.

At the side opposite the exhaust valve seat, the head is equipped with a large flat, laterally extended chamber 16, partially overlapping the cylinder, as at 17, but for the major part extending laterally beyond the cylinder as indicated at 18. A fuel injection valve 19 is mounted in the head in position for injecting fuel into the chamber 16, or rather directly into the laterally extended portion 18 thereof.

An exhaust valve 20 cooperates with the seat 15 and has its stem 21 extended upwardly through the head, into the valve housing or chamber 22. The valve 20 is seated in the usual manner by a spring 23.

The cylinder block includes a lateral extension 24 in which is formed an intake passage 25 which communicates vertically with the chamber 16, or rather the laterally extended portion 18 thereof, through a valve seat 26. An intake valve 27 controls the passage of air through the passage 25 and seat 26. The stem 28 of the valve extends downwardly through the wall of the passage 25 to receive the usual tappet equipment and the spring 29 by which the valve is held seated. The exhaust valve 20 is unseated by the usual rocker 30 and rod equipment 31, and it is to be understood that the exhaust valve rod 31 and the inlet valve stem 28 are moved by the usual cam and tappet equipments actuated by the usual cam shaft 32.

The overlying portion 17 of the head chamber 16, through which the chamber communicates with the cylinder 5, is arcuate in shape as indicated at 33 in Figure 5, the arc extending through approximately 90° of a circle. The overlying opening is of uniform width radially, its outer limit comprising, and thereby conforming to, the adjacent wall of the cylinder, and its inner wall conforming generally to the curvature of the adjacent portion of the exhaust valve seat 15.

Because of the novel proportioning and arrangement of the relatively flat, laterally projected chamber 16, air entering the chamber through the inlet passage 25 and valve seat 26 is directed downwardly into the cylinder in an arcuate solid column along the side wall portion of the cylinder, without turbulence, vacuum spaces or vortices, as indicated by the arrows 34 in Figure 2 of the drawings. This construction and arrangement of the chamber 16 and manner of directing air into the cylinder is very advantageous during the scavenging of the cylinder because the solid column of air indicated by the arrows 34 is diverted upwardly by the piston, as indicated by the arrows 35 in Figure 2, toward the exhaust valve seat and passage 15, 14 so as to provide for a very thorough scavenging of products of combustion from the cylinder in advance of the supercharge of pure air for the explosion or burning next to succeed.

In Figure 1 of the drawings the piston is illustrated as moving downwardly on its power stroke. The exhaust valve, timed to start opening at approximately 68° before the bottom dead center position of the piston, has just cracked open, relieving the pressure in the cylinder. At this time the inlet valve is closed but will be opened approximately 45° before the piston reaches the dead center.

In Figure 2 of the drawings the piston is illustrated as having reached bottom dead center. Both the exhaust valve and the inlet valve are fully open. As soon as the intake port opens, the scavenging air which is under pressure, enters the chamber 16, is formed into a solid column therein, and is directed downwardly along the wall of the cylinder as indicated by the arrows 34 in Figure 2, free from all vortices, vacuum spaces, and the like. This solid column of air forces the burnt gases ahead of it. There is sufficient pressure to maintain the column so that it moves downward, contacting with the piston, and is deflected upward toward the exhaust port as indicated by the arrows 35, thus forcing the gases out through the open exhaust port. The products of combustion thus thoroughly scavenged from the cylinder are replaced by a pure charge of air, and it is to be understood that the exhaust valve closes approximately 10° ahead of the inlet valve so that a supercharging of air into the cylinder can be effected.

In Figure 3 of the drawings the supercharging of pure air is illustrated. In this figure, the exhaust valve, which is closed when the crank shaft has moved about 40° past the bottom dead center, is shown in the closed position, while the inlet valve remains open. As previously stated, the inlet valve remains open for approximately 10° of crank shaft movement.

The parts are so proportioned that at the outward limit of the movement the piston lies very close to the cylinder head, there being very little clearance between the outer face of the cylinder head and the upper face of the piston, as shown in Figure 4 of the drawings. The air, compressed to a state of incandescence by the upward movement of the piston, is crowded into the chamber 16, and the chamber thus constitutes a combustion chamber. With the air charge thus compressed, fuel is injected into the air in the chamber 16 through the injection valve 19 and the charge immediately ignites to start the power stroke of the piston. The injection of fuel actually starts when the crank has reached a point 21° ahead of top dead center, and is discontinued at a point 9° after top dead center. The condition of the parts just following injection of the fuel, or in other words, the commencement of the power stroke, is illustrated in Figure 4. It is to be understood, of course, that the cycle described above in four stages is repeated.

In the improved engine hereinbefore described, the cylinder is devoid of all porting in its side walls, and by thus eliminating the necessity of employing the piston to control such porting, the piston employed in this engine includes a relatively short skirt, providing marked advantages in reduction of weight and friction, and facilitating efficient lubrication. Relatively higher speeds in operation are obtainable in the engine because of the elimination of inertia effects due to the usually included excessive piston weight.

In this engine the novel construction and arrangement of the chamber 16 enables the use of exhaust porting of very large area, and scavenging air is directed into the cylinder in a solid column without objectionable whirling, vacuum spaces or vortices, and in a manner for effecting more thorough scavenging of products of combustion than has heretofore been possible. Also, by arrangement of the chamber 16 as stated, and the utilizing thereof as a combustion chamber, the heat of the gases at initial combustion is in a large measure removed from direct contact with the piston, thus avoiding excessive heating of the piston and materially aiding maintenance of proper lubrication in the cylinder. It will be obvious also that the incoming air passes into and through the combustion chamber 16 and will very effectively scavenge the same and free it from all burnt gases.

While I have shown and described a specific form of construction as an illustrated embodiment of the invention, it will be understood that many changes may be made in the arrangement of the valves and in the shaping of the ports and the chambers associated therewith without departing from the spirit of the invention as the essential features of the invention reside in a construction whereby a solid column of scavenging air under pressure is directed into the cylinder for forcing the burnt gases therefrom.

I claim:

1. In a two-cycle engine of the character described, a cylinder, a head, valve controlled inlet and exhaust passages communicating with the cylinder through said head, a piston reciprocable in the cylinder, means for actuating the piston and valves in timed relation according to the two-cycle principle, said exhaust passage communicating with the cylinder through a valve seat disposed slightly to one side of the axis of the cylinder and of a relatively large diameter overlapping said axis, said inlet passage equipment including a chamber portion formed in the head and shaped by defining wall portions to include a lateral enlargement extending laterally of the cylinder and a portion overlying the cylinder at one side and effective to receive scavenging air under pressure and direct it in a solid column along the adjacent cylinder wall toward the piston to be diverted thereby in reverse direction toward said exhaust passage equipment, and said overlying portion being arcuate in shape to conform generally to the curvature of the exhaust valve seat and bear concentric relation to the cylinder wall portion which it overlies, the defining wall portion nearest said exhaust valve seat constituting a deflecting wall directed toward the piston.

2. In a two-cycle engine of the character described, a cylinder, a head, valve controlled inlet and exhaust passages communicating with the cylinder through said head, a piston reciprocable in the cylinder, means for actuating the piston and valves in timed relation according to the two-cycle principle, said exhaust passage equipment being relatively large in area compared with the diameter of the cylinder and disposed slightly to one side of the axis of the cylinder, said inlet passage equipment including a chamber portion formed in the head and shaped by defining wall portions to include a lateral enlargement extending laterally of the cylinder and a portion overlying the cylinder at one side and effective to receive scavenging air under pressure and direct it in a solid column along the adjacent cylinder wall toward the piston to be diverted thereby in reverse direction toward said exhaust passage equipment, said overlying portion being arcuate in shape and extending through an arc of approximately ninety degrees and uniform in width radially, the defining wall portion nearest said exhaust valve seat constituting a deflecting wall directed toward the piston.

HAROLD B. AUGUSTINE.